Oct. 5, 1965      P. C. ARNOLD ETAL      3,210,520
VERTICAL WELDING PROCESS AND APPARATUS THEREFOR
Filed July 29, 1963      4 Sheets-Sheet 1
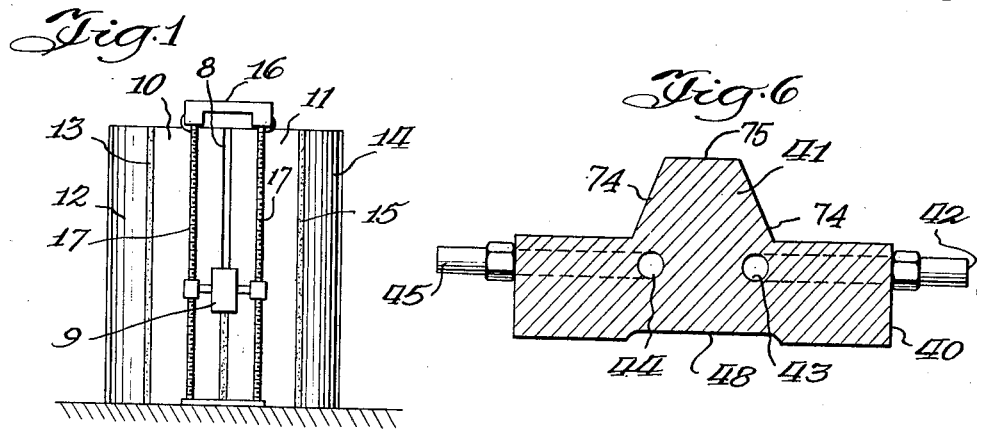
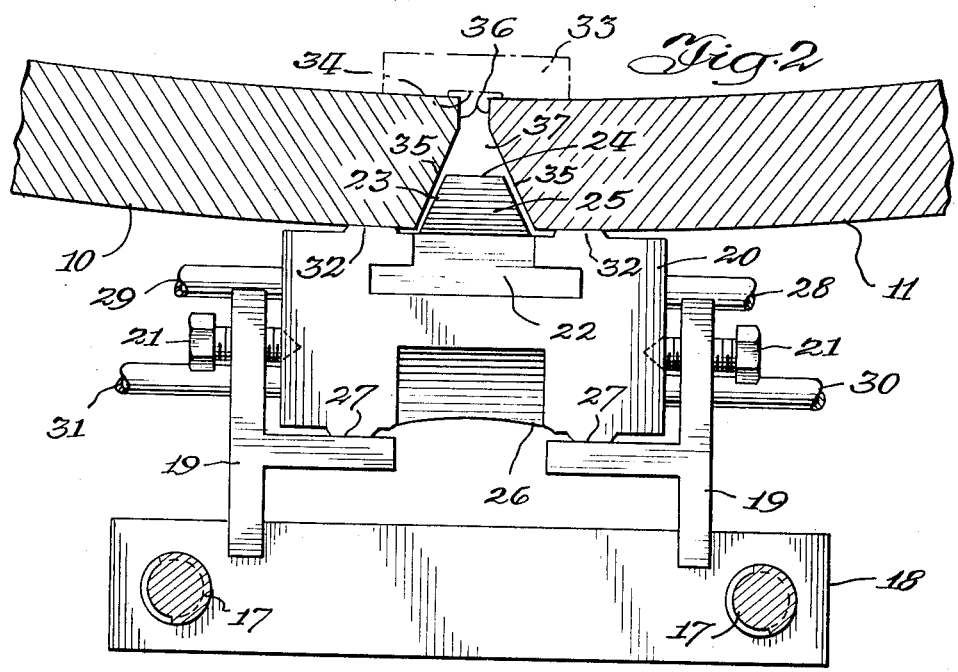
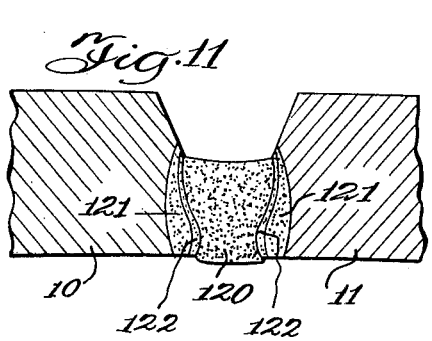
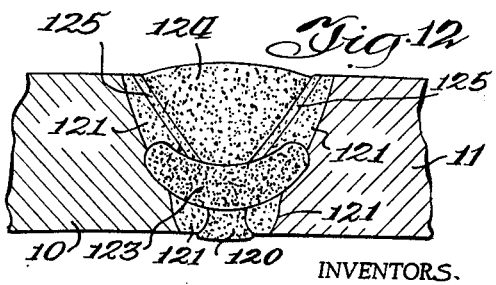
INVENTORS.
Perry C. Arnold
Donald C. Bertossa
By Merriam, Smith & Marshall
Attorneys

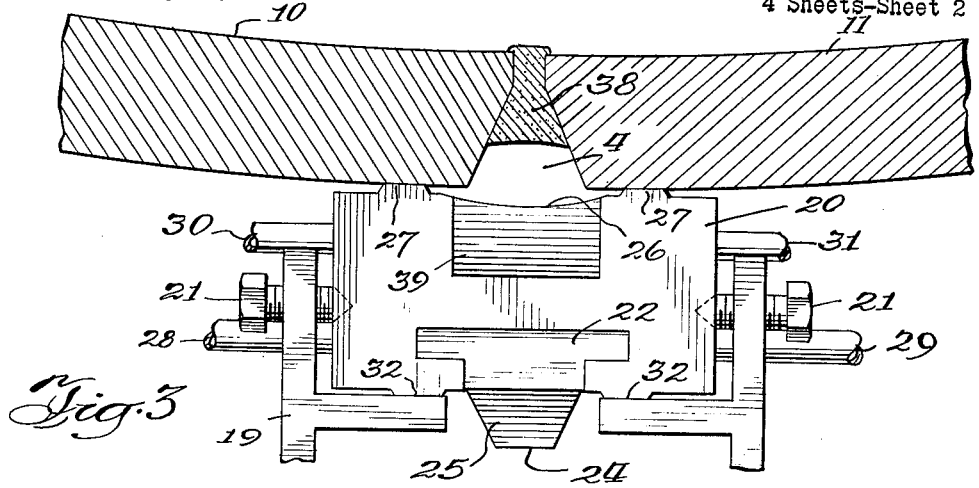
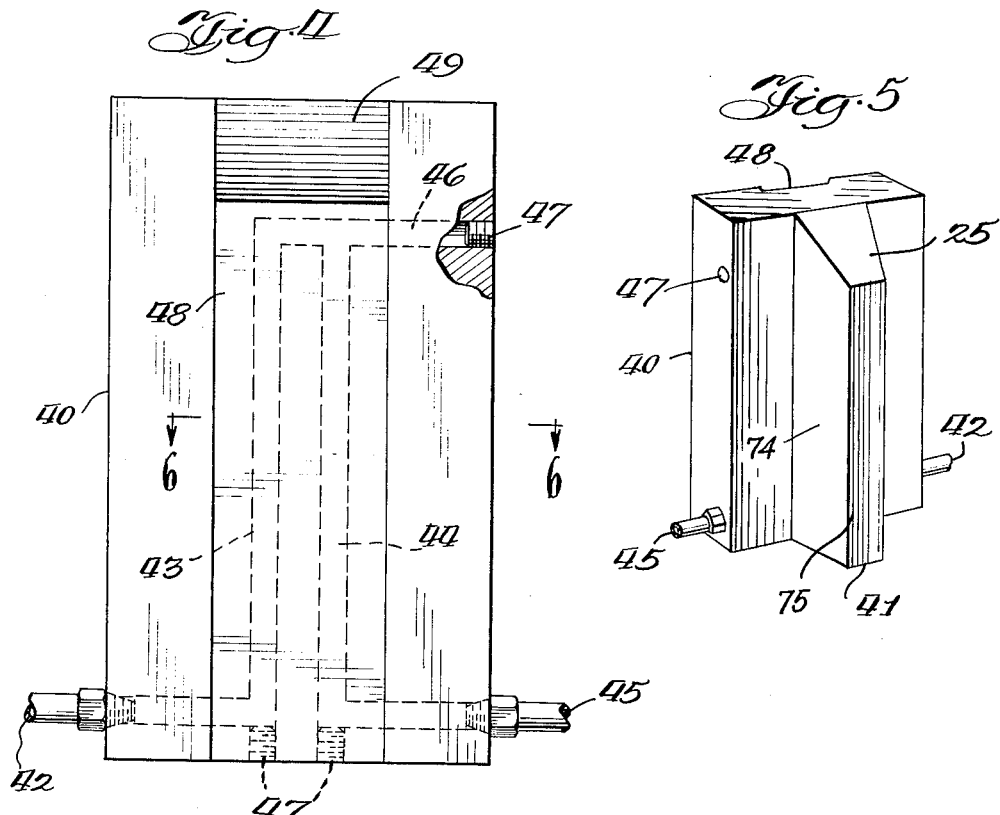

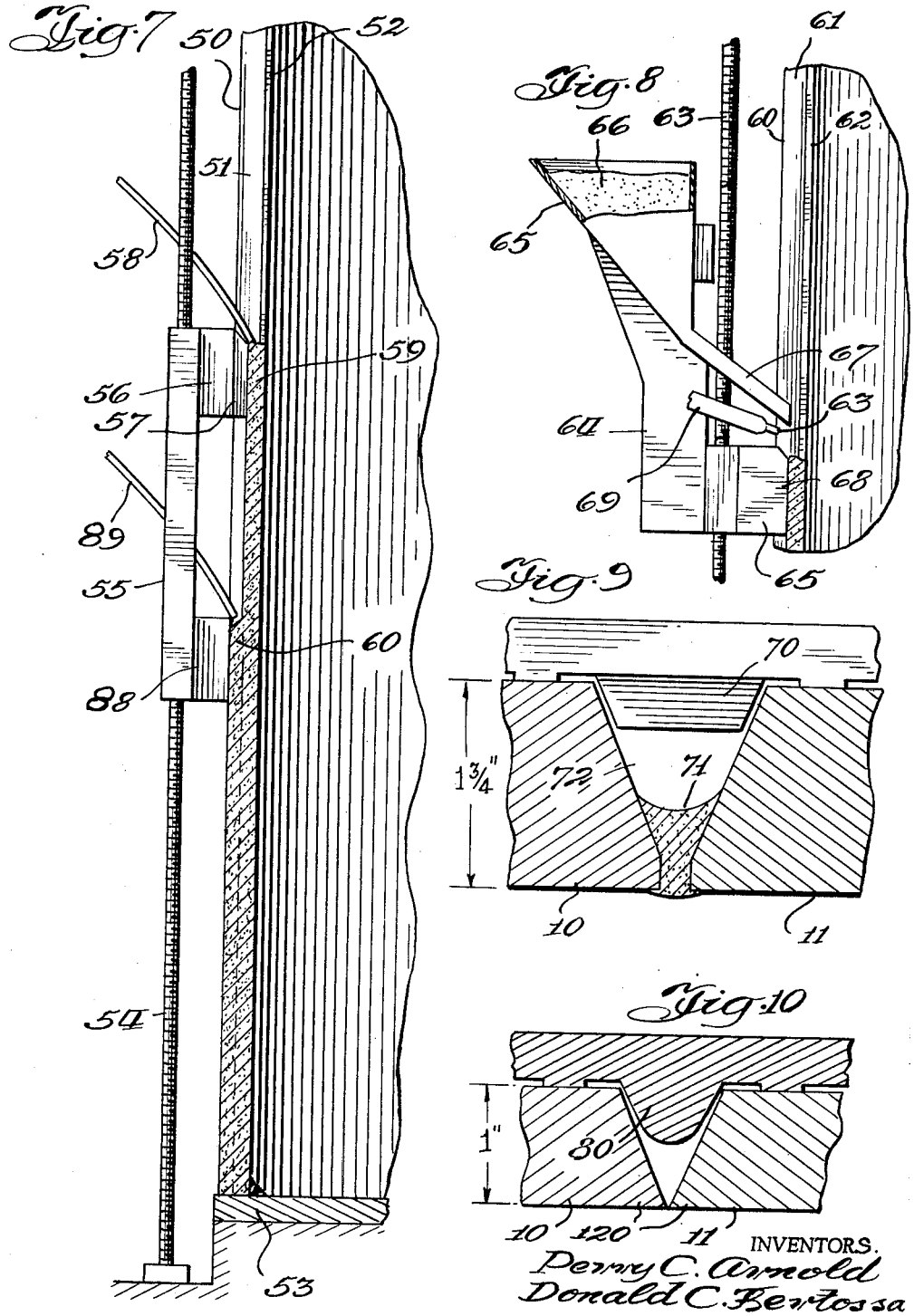

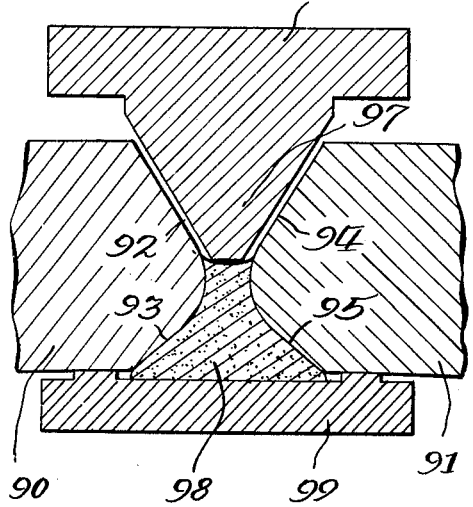
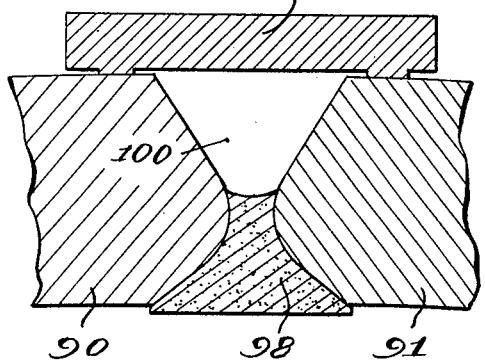
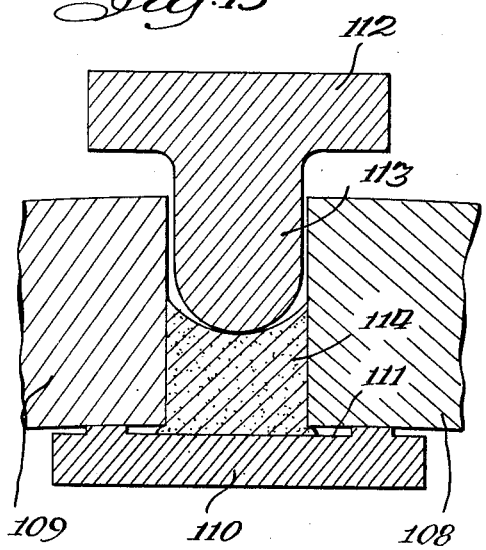
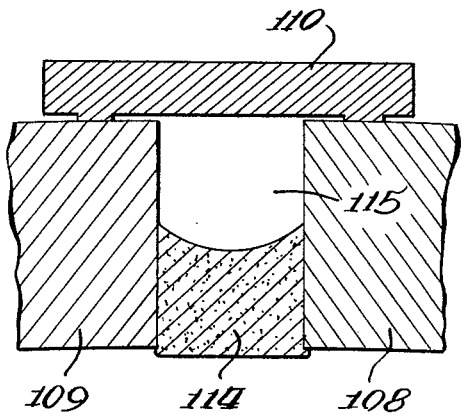

ered. Set#. Typs Patent Office 3,210,520

Patented Oct. 5, 1965

3,210,520
VERTICAL WELDING PROCESS AND APPARATUS THEREFOR
Perry C. Arnold, Western Springs, and Donald C. Bertossa, Naperville, Ill., assignors to Chicago Bridge & Iron Company, Oak Brook, Ill., a corporation of Illinois
Filed July 29, 1963, Ser. No. 298,050
18 Claims. (Cl. 219—126)

This invention relates to welding apparatus. More particularly, this invention is concerned with apparatus and methods for welding vertical joints in the fabrication of various objects from metal plates and particularly, steel plates.

The fabrication of large vessels, tanks and other objects from metal plates is an established art. Most such vessels are formed by joining plates together by welding. Horizontal joints have been welded commercially with automatic equipment for almost ten years. Vertical joints, however, are still almost entirely welded by hand. This is particularly so with vertical welded joints of steel plates.

Although there is apparatus available for the automatic welding of vertical joints, none heretofore used has been entirely satisfactory. The equipment used was expensive and the welded joints obtained were generally poorly made and with unsatisfactory mechanical properties.

There is provided by the subject invention, novel apparatus and methods for producing vertical welded joints. This invention broadly comprises the joining together of vertically upstanding plates having vertical edges approximately equally spaced from each other in abutting including near abutting, upright position by means of a vertical weld produced by placing a cooling and weld-retaining shoe-bar at the junction of the plates with the inner vertical side of the shoe-bar comprising a nose portion positioned between the vertical abutting edges of the plates in approximate contact therewith between the front and back plate surfaces, moving the shoe-bar upwardly while depositing molten metal between the abutting edges of the plates and against the inward vertical nose portion of the bar, cooling the molten metal as the shoe-bar moves progressively upwardly and effecting solidification of the weld while it is in contact with the inner face of the shoe-bar. The inner face of the shoe-bar is contoured to shape or limit the weld applied to specific areas thus allowing multiple weld passes to be applied. The described method of this invention is suitable for producing a weld which in one pass joins the plates together by a weld of less thickness than the plates being joined. After the first weld pass is completed, at least one more weld pass is applied between the abutting edges of the joint and in intimate continuous fusion with the first weld pass.

The invention will now be described in conjunction with the accompanying drawings in which:

FIGURE 1 is an elevational view showing vertical plates having their edges in abutting relationship with a welding rig mounted on the top edges of the plates;

FIGURE 2 is a plan view, partially in section, of apparatus used for applying a first weld pass in a vertical joint;

FIGURE 3 is a plan view, partially in section, showing apparatus, similar to FIGURE 2, for applying a second weld pass in a vertical joint;

FIGURE 4 is a back elevation of a welding shoe-bar;

FIGURE 5 is a front isometric elevation of the shoe-bar of FIGURE 4;

FIGURE 6 is a horizontal section taken at lines 6—6 of FIGURE 4;

FIGURE 7 is an elevation, partially in section, of apparatus for applying two weld passes one after the other in tandem to a vertical joint;

FIGURE 8 is a fragmentary elevational view, partially in section, showing apparatus for delivering flux to a vertical joint during welding;

FIGURE 9 is a plan view, partially in section, of the edges of abutting plates joined by a first weld pass with a shoe-bar having a nose extending inwardly for applying a second weld pass in a joint that requires three weld passes for completion;

FIGURE 10 is a horizontal sectional view of a non-reversible shoe-bar with a rounded nose projecting inwardly into the bevelled groove, having no lands, between abutting vertical plates;

FIGURE 11 is a cross-section of a vertical joint showing the heat affected zones of the first weld pass;

FIGURE 12 is a horizontal cross-section of a vertical joint completed in two weld passes and showing the refined crystal structure in the area between the weld passes;

FIGURE 13 is a horizontal cross-sectional view showing schematically an arrangement for applying the first of a plurality of weld passes in a vertical joint;

FIGURE 14 is a horizontal cross-sectional view of apparatus for applying the second weld pass to the vertical joint shown in FIGURE 13;

FIGURE 15 is a horizontal cross-sectional view showing schematically apparatus for applying the first weld pass to a vertical joint between abutting squared-off edges of vertical plates; and FIGURE 16 is a horizontal cross-sectional view showing schematically apparatus for applying the second weld pass to the joint of FIGURE 15.

In the following discussion, identical parts which appear in more than one view will be numbered alike unless otherwise indicated.

A rig such as can be used in practicing this invention is shown in simplified form in FIG. 1 where vertical plates 10 and 11 are to be welded together at a vertical joint 8. Plates 10 and 12 have been joined by a vertical welded joint 13 and plates 11 and 14 have been joined by weld 15. A supporting carriage 16 rides on the top edges of the vertical plates. Extending downwardly from the carriage are two screw means 17 which support a welding unit 9 in a manner such that turning of the screws raises and lowers the welding unit. More detailed information concerning such rigs can be found in United States Patent 2,794,901.

Referring now to FIG. 2, the plates 10 and 11 are shown in horizontal cross-section with abutting edges positioned for joining by welding. Although the plates as shown in the drawings are curved, the apparatus and method of this invention are equally applicable to vertical joints of flat plates.

Forming part of the welding unit 9 is block 18 on which the frame 19 is mounted in a rigid, fixed position. Each of the elements forming the frame 19 is shown to be T-shaped and to comprise means for securely mounting a composite shoe and shoe-holding element 20. Set screws 21 or other suitable means are used to movably secure shoe-element 20 in the frame 19. Positioned in the shoe-element 20 is shoe-bar 22, having a projecting nose 23 which terminates at the inner surface 24. The upper edge of the nose 23 is slanted downwardly to form surface 25 which is more clearly shown in FIG. 5.

Referring again to FIG. 2, the shoe-element 20 is provided with a channeled area 26 which terminates in runner surfaces 27. The channeled area 26 is used for applying a finishing weld pass which merges with the plate surfaces at the vertical joint as will be shown more clearly during the discussion of FIG. 3.

In FIG. 2 tube 28 carries a cooling liquid or gas into the shoe-bar 22 for cooling the same during the welding operation. The coolant is removed by pipe 29. Similarly, the shoe-element 20 has a coolant introduced therein by means of pipe 30. The coolant is removed from the shoe-element by pipe 31.

Runner surfaces 32 are also provided to lessen frictional contact against the plate surfaces when the shoe-bar 22 projects into the joint during the initial weld pass.

Securely fastened at the back of the vertical joint is a retaining bar 33. It has a cut-in or channeled area 34 into which the molten weld material protrudes slightly beyond the surface of the plates during the welding operation. As the molten weld material solidifies, shrinkage takes place and the weld surface contracts although generally not enough to bring the weld surface precisely level with the plate surface. Only a slight excess of solidified weld metal protrudes beyond the plate surfaces. Retaining bar 33 is also cooled by suitable means not shown such as by circulating a coolant such as water through the interior thereof which is hollow.

The shoe-bar 22, the shoe-element 20 and the retaining bar 33 are advisably produced of material which conducts heat rapidly, such as copper or other similar material. However, these parts can be made of material which resists the temperatures and molten metal of the welding operation, such as suitable ceramic or refractory materials.

The vertical plates 10 and 11, as shown in FIG. 2, have their abutting edges spaced apart slightly and with each abutting edge bevelled 35. The edges however can be butted tight and into contact with each other. The bevelled edge extends almost the thickness of the plate and will be seen to terminate at lands 36. However, the bevel can extend the full thickness of the plates as lands are not essential. The nose 23 of shoe-bar 22 has bevelled sides which complement the bevelled edges of the plates and permit it to extend into the groove between the plates.

Although it is not essential in the practice of this invention, it is generally most advisable to employ plates having vertical bevelled edges such as 35 in FIG. 2 so that if the apparatus for automatically welding the vertical joints breaks down or is unavailable, the joint can be completed by conventional hand-welding operation. Bevelling the plates, therefore, avoids a complete dependence upon automatic equipment for making the joint. In field erection of tanks and vessels, this is a distinct advantage because it provides an alternative welding means which can avoid the loss of many hours of labor, and permit the assembly of the structure being fabricated, if the automatic equipment is broken or unavailable. It also permits standardization of edge preparation in shops for field welding.

Referring still to FIG. 2, molten metal for the weld is deposited in the space 37 bounded by the abutting edges of plates 10 and 11, surface 24 of the shoe-bar and by the retaining bar 33. Any suitable welding heads and apparatus can be used for depositing the molten metal in the joint. However, electric arc-welding means is advisably used. Electric arc-welding, when employed, can be used in conjunction with a suitable inert material to protect the molten metal from the atmosphere. An inert gas such as nitrogen, carbon dioxide or helium, or a layer of flux, or a combination of an inert gas and a flux, can be maintained on the surface of the molten metal.

The weld pass begins at the bottom of the vertical joint and moves progressively upwardly, desirably at a uniform rate, until the weld pass is completed for the entire length of the joint. The rate of travel will be determined by the plate thickness and the number of passes to be employed in completing the joint. Of course, the capacity of the welding head and the electrode used must be correlated with the rate of travel to complete the weld in a satisfactory and acceptable manner without having voids or burned-out areas. Rates of travel are usually from about 2 to 14 inches per minute for a first pass and from about 5 to 8 inches per minute for the second pass.

Regardless of the rate of travel, the molten metal is maintained behind and in contact with the shoe-bar surface 24 until the weld metal solidifies.

In FIG. 3 there is shown the completed first weld pass, which has been under discussion in regard to FIG. 2, deposited in the joint between plates 10 and 11. The weld 38 is essentially deposited in the space shown as 37 in FIG. 2 although, of course, in depositing the weld pass, a weld is formed by melting a certain amount of the edges of each plate as well as of the metal electrode used in the welding operation. There is thus a fusion of metal from these sources to form the weld pass.

To apply the second weld pass to the joint as shown in FIG. 3, the shoe-element 20 is reversed in the frame 19 so that the surface 26 is in straddling position to the vertical joint. The sloped portion 39 spans the joint to be welded at a sharp angle to permit more ready visibility of the molten metal of the weld and also to facilitate the insertion of the electrode flux or protective atmosphere into the area 4 where the molten pool is formed and retained so as to produce the second weld pass. The slanted or sloped area 39 is similar to the sloped area 25. The concave or slightly dished area 26 permits the molten metal to protrude slightly beyond the surface of the metal plates so that upon subsequent shrinkage of the molten metal a weld is obtained having an outer surface approximately flush or slightly extending beyond the surface of the plates.

The vertical length of the shoe-bar 22 and of the shoe-element 20 generally need not be greater than about 4 to 6 in. although they can be longer if desired. The retaining bar 33 shown in FIG. 2 can be any desired length. It can extend the full length of the joint being welded and can be temporarily fixed in position as by clamps. Alternatively, it can be arranged movably to progress at a speed equal to the speed of the weld being applied.

In FIGS. 4 through 6, another embodiment of a welding shoe-bar is shown having a projecting nose for insertion between the vertical edges of abutting upright standing plates. In each of these figures, the same number will refer to identical parts. The shoe-bar 40 is essentially a rectangular block having the projecting nose 41 extending the length of the block. The top surface 25 of the projecting nose is slanted downwardly. The vertical sides of the projecting nose 41 are slanted inwardly at 74 so that the front end 75 of the nose is narrower than the nose base where it merges integrally with the block 40. Although the nose 41 is shown to be an integral part of the block, it can be made as a separate piece and removably attached to the block 40. In this manner, nose portions of varying size can be used interchangeably according to the size of the joint to be welded and the thickness of the plates to be joined.

To obtain cooling of the shoe block during the welding operation, inlet means 32 is provided for circulating a coolant such as water through channel 43 and into channel 44 and from there out through exit pipe 45. The circulating holes or channels 43 and 44 can be produced by drilling elongated holes into the block. They can be joined into a continuous circuit by drilling hole 46 through the side of the block. Cap screws 47 can be used to seal the ends of the holes.

The side of the welding shoe-bar 40 opposite the nose portion is provided with a shallow, vertical channel 48 which runs the length of the block. This channel 48 is of sufficient width to span the gap between the plates at the joint. This side of the welding shoe-bar 40 is used for the application of the final weld pass on a particular side of the joint. The shallow channel portion 48 performs the same function as the dished portion 26 shown in the welding shoe in FIGS. 2 and 3. The upper portion of the welding shoe 40 has a slanted portion 49 approximately the width of the shallow channel portion 48. This slanted portion performs the same function as the sloped portion 25 at the top of the protruding nose 41 in shoe-bar 40.

Referring now to FIG. 7, there is shown an elevational view, in schematic from, of a tandem arrangement for making a vertical weld joint in two passes from the same side of the plates. Plate 50 has a bevelled portion 51 and an inner land portion 52. The vertical edge of the other plate, which is not shown, is similar. The plate 50 is mounted on base plate 53. Screw means 54 is provided for moving the welding assembly 55 upwards and downwards although in the welding operation itself, the weld joint is produced in an upwardly direction. Mounted on the welding assembly 55 is a welding shoe 56 having a protruding vertical nose 57 which fits into the groove formed by the bevelled edges of the abutting plates. Welding electrode 58 extends into the groove and it deposits weld 59. Similarly, there is a welding shoe 88 mounted on the welding assembly 55 for use in conjunction with the second weld pass which is applied by electrode 89. The second weld pass completes the weld joint.

A schematic arrangement is shown in FIGURE 8 for providing flux at the site of the molten metal used to make the weld. The plate 60 is provided with a bevelled edge 61 which is shown to extend partly, although it can extend entirely, through the thickness of the plate and ends at land 62. Screw 63 moves the welding head 64 up and down as desired for the welding operation. The welding shoe 65 has a nose 68 which projects partially into the groove of the joint between the abutting plates. The electrode 63 may be mounted in a ceramic holder 69 to protect against arcing with other equipment or the edges of the plates. A hopper 65 is provided to hold suitable flux material 66 for delivery by spout means 67 to the site of the molten weld material. Means are provided, not shown, for regulating the flow of the flux to keep a layer of flux on top of the molten pool of welding metal during the welding operation.

In FIG. 9, plates 10 and 11 are of considerable thickness and to complete the vertical weld three separate weld passes can be used. This drawing is a plan view partially in section of a joint having the first weld pass already made and with a welding shoe-bar having a nose portion 70 which projects partially into the groove formed by the bevelled edges of the plate. The nose portion of the shoe used in the first weld pass extended into the vertical joint sufficiently so as to maintain the weld pass at the surface 71 of the first weld pass. After the second weld pass is deposited in the area 72, the joint is completed by a third weld pass using a welding shoe such as is shown in FIG. 3 for applying the finishing weld pass.

In FIG. 10 there is shown a nonreversible welding shoe-bar having a slightly different nose portion 80 for insertion in the groove between the vertical edges of abutting plates. The nose portion 80 is shown in horizontal cross-section to be substantially parabolic in shape. This shape permits the nose portion to ride in and out of the vertical joint with variations in the width of the groove as sometimes results because of the difficulty in maintaining precise spacing between the vertical abutting edges of the plates. Such a nose structure sometimes avoids undue binding in the joint being welded. This figure also shows fully bevelled plate edges, without lands which are in tight abutting contact with each other for applying a first weld pass. In the absence of a weld retaining shoe-bar on the back side of the joint it is advisable to use a flux or gas shield in the area of surfaces 120 by the joint to protect the weld.

Referring now to FIGS. 13 and 14, which should be considered together, there is shown in horizontal cross-section plates 90 and 91 having both abutting edges doubly bevelled. Thus, plate 90 has edge portions 92 and 93 bevelled while plate 91 has edge portions 94 and 95 bevelled. The edges of the plates 90 and 91 are bevelled so as to be opposite, but identically shaped. A welding shoe-bar 96 having a nose portion 97 is provided on one side of the vertical joint. This shoe-bar can be removably secured in a fixed arrangement or it can be adapted to move upwardly as weld pass 98 is deposited. Its function is to keep the molten weld in position so as to achieve a pass of uniform thickness. On the other side of the plates, a welding shoe 99 is employed to hold the molten weld metal in position on that side as the joint is welded. The welding shoe 99 is positioned on a welding rig, such as shown in FIG. 1, and is arranged to move upwardly as the weld metal is deposited. The welding shoe 99 is shown shaped and adapted for the application of a single welding pass from the side of the plate on which it is used. However, if the plates are of substantial thickness, a movable welding shoe having a nose portion can be employed in its place to deposit a first weld pass in the joint and then a second weld pass applied by use of the weld finish shoe 99. In any event, after one side of the joint is completed, the joint may be further welded from the other side by use of other shoes such as a finish shoe 101 in place of the shoe 96. Thus in FIG. 14 the weld 98 has been applied and a finish welding shoe 101 positioned for use in applying a weld in the space 100. In this manner, the joint can be completed by two weld passes.

In FIGS. 15 and 16 there is shown schematically by horizontal sections how a vertical joint in which the vertical edges of the plates are squared off can be welded by a series of weld passes. A retaining welding shoe 110 can be fixedly mounted on one side of the joint. This shoe is provided with a shallow channeled portion 111 which spans the width of the joint. This shallow channel portion permits the molten welding metal to extend slightly beyond the surface of the plates and to provide a reservoir of metal to take up the subsequent shrinkage and provide a joint surface which does not sink below the plate surfaces. A welding shoe-bar 112 having a nose portion 113 is mounted on a welding rig for movement upwardly as the first pass of the weld 114 is deposited. This weld can be approximately one-half the thickness of the plates, or less depending upon the number of weld passes to be used in completing the joint. In FIG. 16 there is shown the plates 108 and 109 having the first weld pass 114 in position for application of a second weld pass in space 115. A welding shoe 110 can be used to apply the second and finishing weld pass.

The automatic production of vertical joints by multi-pass welds, as described herein, gives superior joints because each weld pass after the first results in grain refinement of a portion of the previously applied weld pass and plate heat affected zone. This results in a stronger joint and also leads to a diagonal coarse grained heat affected zone, rather than a perpendicular zone, through the thickness of the plate. Perpendicular zones as produced by prior art vertical welding operations provide a shorter path of coarse grain plate for failure through the thickness dimension than joints having diagonal heat affected zones. In this regard, FIG. 11 shows plates 10 and 11 which have had a first weld pass applied as in FIG. 2. The main body of weld metal 120 comes from the electrode used in the welding but is diluted by plate. It is deposited in a fairly coarse grain structure. The portions 121 are fine grained recrystallized plate which has not melted. However, there are coarse grain recrystallized plate zones 122 which are of lower strength than other parts of the joint. The elimination of such coarse grain areas is highly desirable since they lower the impact resistance of the weldment.

In FIG. 12 there is shown a completed weld joint formed by applying a second weld pass over the weld pass shown in FIG. 11. In applying the second weld pass 124 which is fairly coarse grained, the grain area of the weld metal diluted by plate of the first pass 120 which is unaffected by the heat is reduced to a small area. The heat due to the deposition of the second weld pass, however, causes grain refinement and produces an area 123 made up of weld and heat affected plate recrystallized to a fine grain structure by heat from the second pass. The areas 121 are fine grained recrystallized plate. These heat affected areas extend through a major part of the thickness of the plates after the welding passes are deposited. Areas 125 are of somewhat coarse grain structure in the unmelted plate metal and are formed next to the second weld pass. This coarse area, however, is far less in severity and size than would be present in a welded joint made by prior art methods in which a single weld pass is employed to join the whole edges of the plate. In such methods, the coarse structure extends perpendicularly through the entire thickness of the plates. By using a multi-pass system as shown and described herein, a very fine grain structure is obtained extending in a diagonal manner through at least a major portion of the thickness of the plates. This is a far better quality joint than anything obtained previously in making vertical weld joints by previously known automatic methods.

What is claimed is:

1. The method of joining together two vertically upstanding plates having vertical edges approximately equally spaced from each other in abutting upright position by means of a vertical weld joining said abutting edges which comprises placing a weld-retaining shoe-bar having an inner vertical side comprising a nose portion positioned between the vertical abutting edges of the plates in approximate contact therewith with the front of the nose portion of the shoe-bar positioned between the front and back plate surfaces of the plates, moving the shoe-bar upwardly while depositing molten metal between the abutting edges of the plates and against the nose portion of the shoe-bar, cooling the molten metal as the shoe-bar moves progressively upwardly and effecting solidification of the weld while it is in contact with the nose portion of the shoe-bar.

2. The method of welding two plates in upright approximately vertical position having vertical abutting edges approximately equally spaced from each other which comprises placing a nose portion of an elongated shoe-bar between the vertical edges of said plates so that the inward side of the nose portion is located between the front and back surfaces of the plates, producing a molten pool of weld metal between the edges of the plates and in contact with the inward side of the shoe-bar, moving the shoe-bar upwardly while the nose portion is located between the edges of the plates with the molten pool of welding metal in contact with the inward side of the nose portion while simultaneously cooling the weld unit it solidifies prior to leaving contact with the nose portion thereby depositing a weld of less thickness than the plates being joined and continuing to so weld the joint thereby forming a single weld pass which joins the edges of the vertical plates together and thereafter applying at least a second weld pass on the first weld pass by means of molten metal applied onto the first pass and between the edges of the vertical plates, said second pass being controlled as to deposit by means of a shoe element which maintains the molten weld metal in the joint between the plates as it is deposited in molten condition and which shoe is moved upwardly as the second welding pass is deposited and cooled in the joint between the plates.

3. The method of welding two plates in upright approximately vertical position having vertical abutting edges with adjacent vertical edges on the same side of the plates being bevelled which comprises placing a nose portion of an elongated shoe-bar between the vertical bevelled edges of said plates so that the inward side of the nose portion is located between the front and back surfaces of the plates, producing a molten pool of weld metal between the edges of the plate and in contact with the inward side of the shoe-bar, moving the shoe-bar upwardly while the nose portion is located between the edges of the plates with the molten pool of welding metal in contact with the inward side of the nose portion while simultaneously cooling the weld until it solidifies prior to leaving contact with the nose portion thereby depositing a weld of less thickness than the plates being joined and continuing to so weld the joint thereby forming a single weld pass which joins the edges of the vertical plates together and thereafter applying at least a second weld pass on the first weld pass by means of molten metal applied onto the first pass and between the bevelled edges of the vertical plates, said second pass being controlled as to deposit by means of a shoe element which maintains the molten weld metal in the joint between the plates as it is deposited in molten condition and which shoe is moved upwardly as the second welding pass is deposited and cooled in the joint between the plates.

4. The method of joining together the edges of vertically positioned plates in which the vertical edges are in aligned, approximately equally spaced proximity from each other to form a gap, which comprises placing a weld retaining shoe on one side of the plates and spanning the gap between the plates, positioning the nose portion of a shoe-bar in slidable arrangement between the vertical edges of the plate and in approximate contact therewith, depositing a pool of molten weld metal between the retaining shoe and the inward vertical side of the nose portion thereby controlling the position of the molten weld metal, upwardly moving the said shoe-bar while continually depositing molten weld metal between the inward vertical side of the nose portion of the shoe-bar and the retaining shoe, maintaining contact between the nose portion and the weld until the weld has solidified thereby depositing a weld of less thickness than the plates being joined and continuing the weld pass until the desired length of weld is deposited.

5. The method of claim 4 in which a second weld pass is applied over the first pass and between the edges of the plates, said second weld pass being deposited by producing molten welding metal between the edges of the plates and on the first weld pass while controlling the deposition of the second weld pass by means of a slidable shoe which has a face adjacent and about planar to the plate surfaces, said face being maintained in continual contact with the molten metal of the second weld pass as it is deposited and until it solidifies, and moving the shoe upwardly as the second weld pass is deposited while keeping the shoe in contact with the weld metal until solidification of the same is effected.

6. The method of joining together the edges of vertically positioned plates with adjacent vertical edges on the same side of the plates being bevelled, which comprises placing a weld retaining shoe on one side of the plates and spanning the joint between the plates, positioning the nose portion of an elongated shoe-bar between the vertical bevelled edges of said plates and in slidable arrangement therewith, depositing a pool of molten weld metal between the retaining shoe and the inward vertical side of the nose portion thereby controlling the position of the molten weld metal, upwardly moving the said shoe-bar in the bevelled groove while continually depositing molten weld metal between the inward vertical side of the nose portion of the shoe-bar and the retaining shoe, maintaining contact between the nose portion and the weld until the weld has solidified thereby depositing a weld of less thickness than the plates being joined and continuing the weld pass until the desired length of weld is deposited.

7. The method of claim 6 in which a second weld pass is applied over the first pass and between the edges of the plates, said second weld pass being deposited by producing molten welding metal between the edges of the plates and onto the first weld pass while controlling the deposition of the second weld pass by means of a slidable shoe which has a face adjacent and about planar to the plate surfaces, said face being maintained in continual contact with the molten metal of the second weld pass as it is deposited and until it solidifies, and moving the shoe upwardly as the second weld pass is deposited while keeping the shoe in contact with the weld metal until solidification of the same is effected.

8. The method of joining together the edges of vertically positioned plates in which the vertical edges are in aligned, approximately uniformly spaced proximity from each other to form a gap and the edge of each plate is bevelled from both sides, which comprises placing a weld retaining shoe on each side of the plates at the gap with at least one of said shoes having an elongated nose portion which projects beyond the edges of the plates and into a groove formed by adjacent bevelled portions of the plate edges, depositing a pool of molten weld metal between the shoes and the plate edges, upwardly moving at least one of said shoes while continually depositing molten weld metal between the shoes and maintaining the shoes in contact with the molten metal until it solidifies.

9. A welding shoe-bar having an elongated vertical nose portion with bevelled side walls which are complementary to, and fit at least partially in, a vertical groove formed by bevelled edges of vertical plates in substantially abutting position to each other, and with the top of the nose portion sloping downwardly toward the front of the nose portion.

10. A welding shoe-bar having an elongated vertical nose portion with arcuate side walls which fit at least partially between abutting vertical edges of vertically positioned plates, and with the top of the nose portion sloping downwardly toward the front of the nose portion.

11. The method of welding two plates in upright approximately vertical position having vertical edges approximately adjoining each other which comprises placing a nose portion of an elongated shoe-bar between the vertical edges of said plates so that the inward side of the nose portion is located between the front and back surfaces of the plates, producing a molten pool of weld metal between the edges of the plates and in contact with the inward side of the shoe-bar, moving the shoe-bar upwardly while the nose portion is located between the edges of the plates with the molten pool of welding metal in contact with the inward side of the nose portion while simultaneously cooling the weld until it solidifies prior to leaving contact with the nose portion thereby depositing a weld of less thickness than the plates being joined and continuing to so weld the joint thereby forming a single weld pass which joins the edges of the vertical plates together and thereafter applying at least a second weld pass between the edges of the vertical plates by placing a nose portion of an elongated shoe-bar between the vertical edges of said plates so that the inward side of the nose portion is located between the front and back surfaces of the plates, producing a molten pool of weld metal between the edges of the plates and in contact with the inward side of the shoe-bar, moving the shoe-bar upwardly while the nose portion is located between the edges of the plates with the molten pool of welding metal in contact with the inward side of the nose portion while simultaneously cooling the weld until it solidifies prior to leaving contact with the nose portion thereby depositing said second weld of less thickness than the plates being joined.

12. The method of claim 11 in which the second weld pass is applied onto the first weld pass.

13. The method of claim 11 in which the first and second weld passes are applied from opposite sides of the plates.

14. The method of claim 11 in which both edges of the plates being joined abut each other and are beveled on at least one side.

15. The method of claim 11 in which the edges of the plates being joined are spaced apart to form a gap therebetween.

16. The method of claim 11 in which the edges of the plates being joined are spaced apart to form a gap therebetween and both edges are beveled on at least one side.

17. The method of claim 11 in which the second weld pass is applied onto the first weld pass and a third weld pass is applied to the joint by depositing a weld using a shoe means element which maintains molten weld metal in the joint between the plates as it is deposited in molten condition and until it cools and the shoe is moved upwardly as the third weld pass is deposited.

18. The method of claim 11 in which the first and second weld passes are applied on opposite sides of the plates and a third weld pass is applied to one of the first and second weld passes by depositing a weld thereon using a shoe means element which maintains molten weld metal in the joint between the plates as it is deposited in molten condition and until it cools and the shoe is moved upwardly as the third weld pass is deposited.

References Cited by the Examiner

UNITED STATES PATENTS

| | | | |
|---|---|---|---|
| 2,133,058 | 10/38 | Paine | 219—137 |
| 2,294,439 | 9/42 | Bagley | 113—59 |
| 2,395,723 | 2/46 | Chmielewski | 219—137 |
| 2,433,354 | 12/47 | Fotie | 219—78 |
| 2,719,210 | 9/55 | Chapman | 219—137 |
| 2,804,885 | 9/57 | Mott | 219—78 |
| 2,852,660 | 9/58 | Maloney | 219—74 |

RICHARD M. WOOD, *Primary Examiner.*

UNITED STATES PATENT OFFICE
CERTIFICATE OF CORRECTION

Patent No. 3,210,520            October 5, 1965

Perry C. Arnold et al.

It is hereby certified that error appears in the above numbered patent requiring correction and that the said Letters Patent should read as corrected below.

Column 5, line 5, for "from" read -- form --; column 7, line 51, for "unit" read -- until --.

Signed and sealed this 19th day of April 1966.

(SEAL)
Attest:

ERNEST W. SWIDER
Attesting Officer

EDWARD J. BRENNER
Commissioner of Patents